United States Patent [19]
Perry

[11] 3,832,432
[45] Aug. 27, 1974

[54] METHOD OF RAZOR BLADE UNIT ASSEMBLY

[75] Inventor: Roger L. Perry, Lynnfield Center, Mass.

[73] Assignee: The Gillette Company, Boston, Mass.

[22] Filed: June 29, 1972

[21] Appl. No.: 267,601

[52] U.S. Cl. ............. 264/249, 29/200 A, 29/428, 29/430, 29/464, 29/509, 29/522
[51] Int. Cl. ............... B23q 3/00, B29c 23/00
[58] Field of Search ............ 29/430, 428, 429, 464, 29/509, 522; 30/32, 47, 50; 76/104, 76; 264/249

[56] References Cited
UNITED STATES PATENTS

| | | | |
|---|---|---|---|
| 2,713,201 | 7/1955 | Plesch | 30/50 |
| 3,324,546 | 6/1967 | Chavez | 30/85 X |
| 3,383,764 | 5/1968 | Sachs | 30/32 |
| 3,388,831 | 6/1968 | Hansom | 30/40.2 X |
| 3,646,674 | 3/1972 | Fitzpatrick | 30/32 UX |
| 3,724,070 | 4/1973 | Dorion | 30/50 X |

*Primary Examiner*—Roy Lake
*Assistant Examiner*—James W. Davie

[57] ABSTRACT

A method of assembling a razor blade unit having two housing components and a blade component is disclosed. The housing components have cooperating housing alignment and blade alignment surfaces. The method includes the steps of securing a first housing component in a predetermined location, depositing the blade component on the first housing component, disposing a second housing component on the blade component, applying a prebiasing force to place the housing alignment surfaces in engagement with one another, then urging the blade component against the blade alignment surfaces while maintaining the prebiasing force on the housing components, and then securing the housing components permanently together to maintain the blade component in the desired aligned relation.

9 Claims, 10 Drawing Figures

METHOD OF RAZOR BLADE UNIT ASSEMBLY

SUMMARY OF INVENTION

This invention relates to assembly methods and more particularly to methods for assembling components of a razor blade unit.

It is a principal object of this invention to provide novel and improved methods for assembling components of a razor blade unit. Another object of the invention is to provide novel and improved methods for assembling components of a plural cutting edge shaving system in an economical, efficient and rapid manner.

It has long been desirable in the shaving field to provide a shaving system which provides both a very close shave and a safe shave. It has been discovered that a plural cutting edge shaving system in which certain geometrical relationships are maintained with accuracy provides superior shaving characteristics. This shaving system includes two cutting edges and a guard structure disposed in fixed and spaced parallel relation to one another so that both cutting edges are successively active with respect to the cutting of a single hair element during a single shaving stroke. This geometry is established in a blade unit in which the blade elements are permanently secured in fixed relation to the guard structure. Still another object of the invention is to provide a method for assembling components of such a razor blade unit in an economical, efficient and rapid manner.

In accordance with the invention there is provided a method for assembling a razor blade unit having a plural component housing and a blade component, the housing components having cooperating housing alignment and blade alignment surfaces. A first component of the housing is secured in a predetermined location and then the blade component is deposited on the first housing component. After a second housing component is placed on the blade component, a first biasing force is applied to the housing components to place the housing alignment surfaces in engagement. The blade component is then urged against the blade alignment surfaces while the first biasing force is maintained on the housing components and then additional clamping force is applied to the housing components. While the housing components remained clamped, they are secured together to maintain the blade component in the desired aligned relation relative to the housing components in permanent manner.

In a particular embodiment, the first housing component is a cap member and includes a blade engaging surface, a housing alignment surface and two sets of blade alignment surfaces. The cap member is clamped in position and two blades and an interposed spacer are loosely stacked on the cap member. A base member that includes a guard structure, a blade engaging surface and a housing alignment surface that cooperates with the housing alignment surface of the cap member is then placed on the stack of blade components and a prebiasing force is applied to the base member to place the housing alignment surfaces in engagement. The blade components are then urged against the blade alignment surfaces of the cap member while the prebiasing force is maintained on the base member to align the blade members relative to the guard surface of the base member. Additional clamping force is then applied to the base member and the housing components are mechanically secured together to provide a permanently assembled blade unit.

Other objects, features and advantages of the invention will be seen as the following description of a particular embodiment progresses, in conjunction with the drawings, in which:

DESCRIPTION OF PARTICULAR EMBODIMENT

Figure 1:
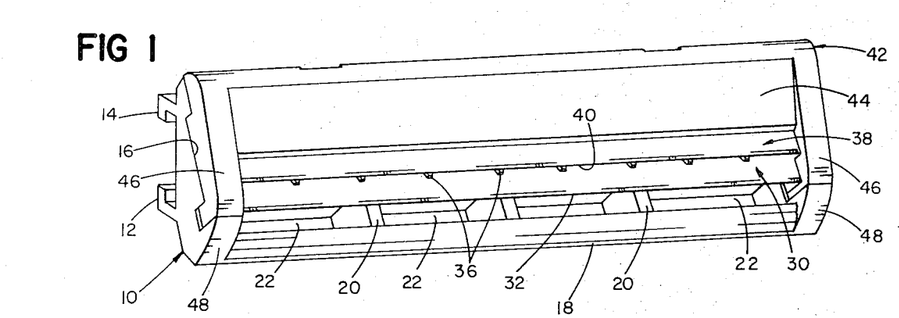
FIG. 1 is a perspective view of a blade unit assembled in accordance with the invention.

The blade unit shown in FIG. 1 includes a base or platform member 10 molded of high impact polystyrene that includes depending coupling structure defined by flanges 12 and 14. The base includes a blade support surface 16 and a transversely extending guard structure 18 that is spaced forwardly of support surface 16 and connected to that surface by webs 20 that define a first row of slots 22. A second row of slots 24 (shown best in FIG. 2), are disposed parallel to the row of slots 22 and extend through platform 16. Disposed on platform 16 is a leading steel blade member 30 having a sharpened cutting edge 32, an aluminum spacer member 34 having a series of triangular projections 36 formed on its leading edge, and a follower steel blade member 38 having a sharpened cutting edge 40. A cap structure 42, also molded of high impact polystyrene, includes a cap surface 44 that extends transversely between end wall portions 46. The forward ends of portions 46 mate with corresponding projecting surfaces of end wall portions 48 of base 10.

Figure 2:
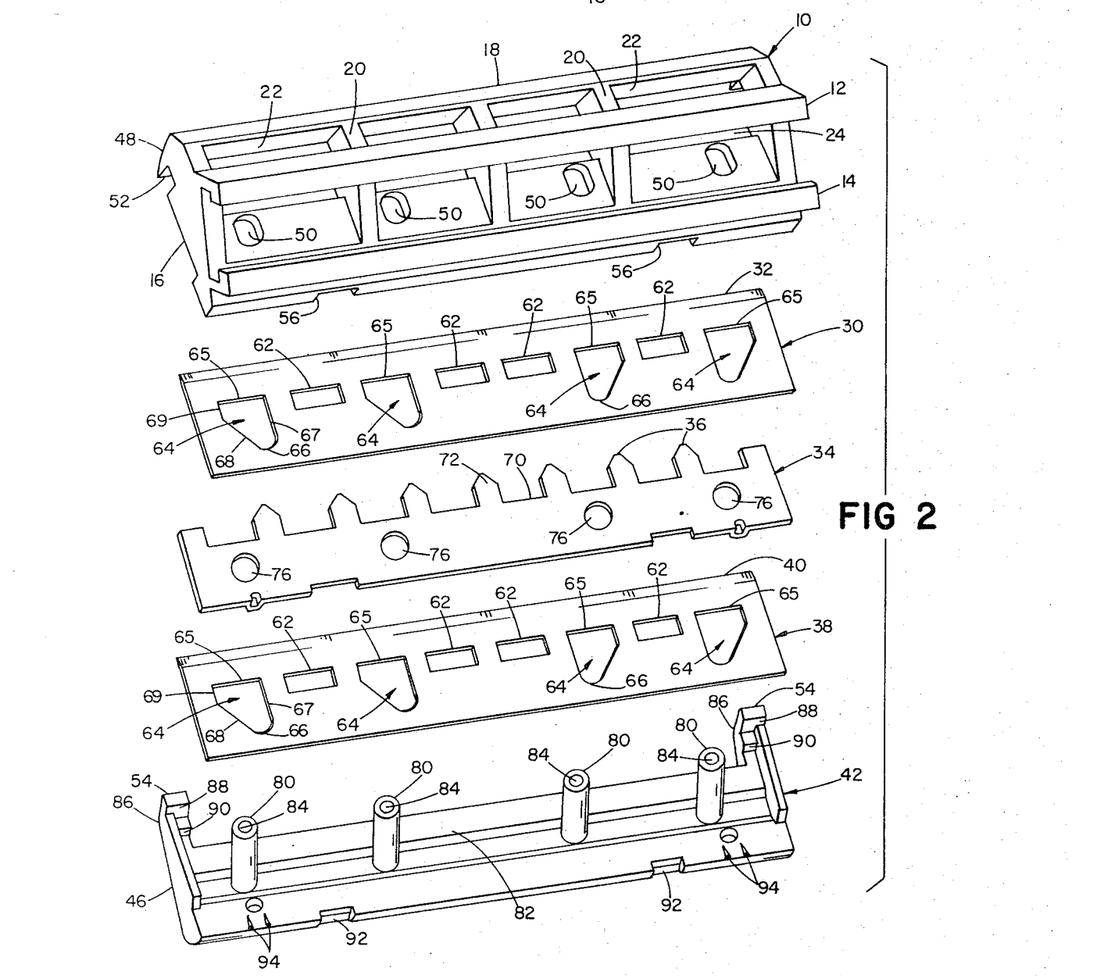
FIG. 2 is an exploded perspective view of components of the blade unit shown in FIG. 1.

Additional details of components of the blade unit may be seen with reference to the exploded view of FIG. 2 which shows the blade unit component in inverted relation, that is the cap structure 42 is at the bottom and the base 10 is at the top of FIG. 2. As indicated in FIG. 2, base member 10 has a series of four apertures 50 which extend through the platform surface 16. Each end portion 48 of the base includes a vertical surface 52 which is adapted to engage a cooperating vertical alignment surface 54 of the cap 42. Recesses 56 are provided at the rear of the base member platform to facilitate blade alignment.

The leading and following blade elements 30, 38 are identical and each has a length of 1½ inches, a width of 0.28 inch and a thickness of 0.004 inch. The front and rear edges of each blade are parallel, the front edge being sharpened to a shaving edge. Formed in each blade member are a series of four axially extending rectangular slots 62, each one-eighth inch long and 0.054 inch wide, and four irregularly shaped apertures 64. The base surface 65 of each aperture 64 is of the same length as each slot 62, the upper end of each aperture 64 is defined by a 0.046 inch radius surface 66, with one end of surface 66 aligned with and connected to the corresponding end of the base surface 65 by surface 67 and the other end of surface 66 connected to the other end of surface 65 by inclined surface 68. It will be noted that the bottom portion of each aperture 64 (defined by surfaces 65, a portion of surface 67 and surface 69) is of the same dimensions as slot 62.

Spacer 34, interposed between the blade elements 30 and 38, has a length of 1½ inches, a width of 0.24 inch and a thickness of 0.020 inch. Formed in the forward edge of spacer 34 are a series of recesses 70, each of which is 0.080 inch deep and about one-eighth inch long; and a series of spaced forwardly directed fingers 72, each of which culminates in a triangular tip portion 36. The spacer has holes 76 which are alignable with holes 50 in the base member 10 and holes 64 in the blade elements 30 and 38.

The cap member 42 includes four posts 80 that project 0.154 inch above planar surface 82. Each post has at its outer end a 0.038 inch diameter recess 84 that is 0.081 inch deep. The two inner posts 80 are spaced about one-half inch apart and each outer post is spaced about three-eighths inch from the adjacent inner post. Each end wall portion 46 includes a forwardly projecting wing 86 on the forward surface of which is formed aligning surface 54 and on the rearward surface of which are formed a second aligning surface 88 which is engaged by the sharpened edge 32 of the leading blade 30, and a third aligning surface 90 which is engaged by the sharpened edge 40 of the trailing blade 38. Recesses 92 are alignable with recesses 56 in the base 10 and ridges 94 engage the upper blade member 38. Similar ridges are formed in the platform member portion 16 of the base 10.

In the assembly process, the cap 42 is positioned with posts 80 extending vertically and then blade 38, spacer 34, blade 30, and base 10 are sequentially deposited on the posts so that the posts 80 extend through the corresponding apertures in those members. After alignment by positioning blade edges 32 and 40 against aligning surfaces 88 and 90, the assembly is firmly clamped together and the upper ends of posts 80 are cold headed to secure the components of the blade unit together.

Figure 3:
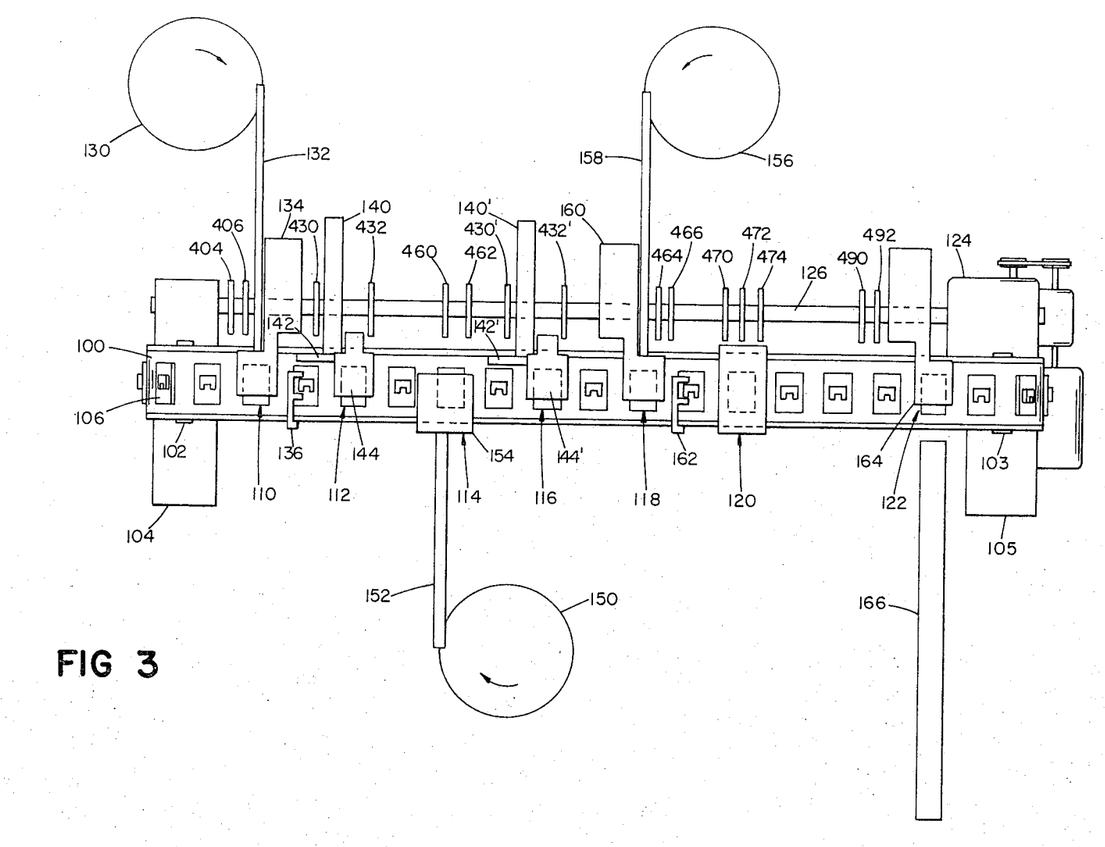
FIG. 3 is a plan view of a system for assembling blade units of the type shown in FIG. 1.

Apparatus which sequentially performs these steps is shown in FIG. 3. As indicated in that figure, a transport belt 100 is supported on spaced shafts 102, 103 which in turn are secured to support members 104, 105. A series of nest structures 106 are secured to transport belt 100. The nest structures are sequentially moved past a series of stations that include a cap loading station 110, a first blade loading station 112, a spacer loading station 114, a second blade loading station 116, a base member loading station 118, an alignment and cold heading station 120, and an unloading station 122. The transport belt 100 and the mechanisms at the several stations are driven in coordination by drive unit diagrammatically indicated at 124 which includes drives for the cam shaft 126 and for indexing the transport belt 100.

Cap members 42 are fed from supply 130 along track 132 to transfer mechanism 134 which loads a cap member 42 into each nest structure where it is clamped in position with posts 80 extending vertically. Sensor 136 photoelectrically senses the presence of upstanding posts 80 of a cap member 42 in each nest. At station 112, a stack of blades 38 is disposed in supply channel 140. The bottom blade of the stack is engaged by slide mechanism 142 which transfers that blade to a transfer mechanism 144 which in turn deposits the blade on posts 80 of cap member 42 secured in the nest 106 at that station. At station 114 a spacer member 34 is transferred from supply 150 along track 152 to transfer mechanism 154 for deposit in similar manner on posts 80. At station 116, a second (loading) blade 30 is transferred, in a manner similar to that of station 112, by slide member 142' from supply channel 140' to transfer mechanism 144' for loading onto the spacer member 34 on posts 80 of the cap member 42 held in the nest at that station. A base member 10 is transferred from supply 156 along track 158 to transfer mechanism 160 for loading onto the posts 80 of the cap member at station 118; and the presence of base structure on the stack of components is then detected by sensor 162 as the nest is indexed past that sensor.

As indicated above, at station 120, the blade elements 30 and 38 and base 10 are aligned with respect to alignment surfaces 54, 88 and 90 of cap member 42, and then the blade unit assembly is clamped together and the posts 80 are deformed in a cold heading operation to secure the components of the blade unit assembly together. The belt 100 is then indexed to transfer the blade unit to unloading station 122 where transfer mechanism 164 removes the assembled blade unit from its nest 106 and places it on transfer conveyor 166 for transport to another area for further processing such as inspection and packaging.

Figure 4:
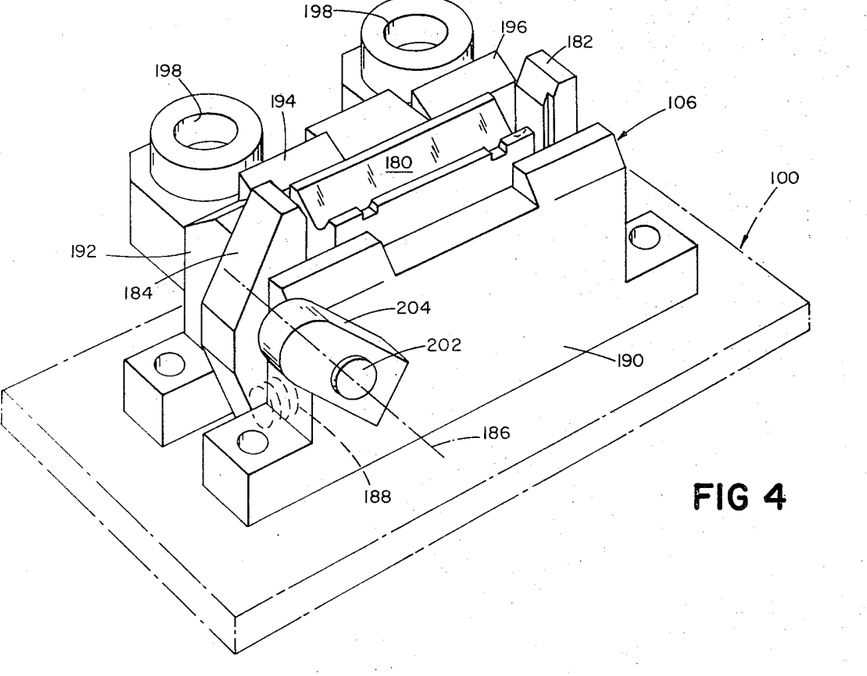
FIG. 4 is a perspective view of a nest unit employed in the system shown in FIG. 3.

A perspective view of a nest assembly is shown in FIG. 4. That nest assembly 106 includes a surface 180 configured to conform to the configuration of surface 44 of cap member 42 which is arranged to receive cap member 42 in supporting relation. Spaced from one end of support surface 180 is fixed post 182 and spaced from the other end is post 184 which is mounted for rotation about axis 186, post 184 being biased for rotation by compression spring 188 which acts between the lower end of post 184 and the body of nest assembly to rotate the upper end of post 184 towards post 182. Side plates 190 and 192 define side walls of the nest assembly. Projecting above side plate 192 are two structures 194, 196 which support the projecting "wings" 86 of the cap member 42 when it is clamped in the nest. Alignment bushings 198, offset laterally from side plate 192, are arranged to receive alignment pins from transfer mechanisms at stations 110, 114 and 118 so that the component being loaded into the nest is disposed in proper alignment with components of and/or in the nest. A shaft 202 extends through side plates 190 and 192 along axis 186 and is secured to post 184. A cam lever 204 is secured to shaft 202 and is arranged to rock end post 184 in a counter-clockwise direction (compressing spring 188) to move the upper end of post 184 outwardly to permit insertion of cap member 42 or removal of an assembled blade unit. The space at either end of surface 180 between that surface and the posts 184, 184 receives the end surfaces 46 of the cap member 42.

As indicated above, each blade loading station includes an inclined guide channel 140 in which is disposed a stack of blade elements; a slide mechanism 142 which is reciprocal in guideways for transferring the lowermost blade in the stack in channel 140 from that stack and a transfer mechanism 144 which is vertically reciprocated by a drive mechanism to receive the transferred blade from slide mechanism 142 and then deposit the blade on posts 80 of a cap member 42 held in a nest 106. The spacer 34, a second blade 30 and base member 10 are deposited in similar manner at stations 114, 116 and 118, respectively.

Details of the mechanism at the aligning and securing station 120 may be seen with reference to FIGS. 5-8. The apparatus at that station includes a support framework 250 with upstanding wall members 252 and cross member 254 which carries shaft 256 to which the upper end of a toggle linkage including links 258 and 260 is attached. Shaft 262 couples links 258 and 260 together and is connected to coupling 264 which is driven by rod 266. The lower end of link 260 is pinned to drive block 268 by shaft 270. Block 268 is received and guided for vertical reciprocation in a channel in frame member 272 and carries four spaced cold heading members 274 that extend vertically downward from the bottom surface of block 268.

Mounted for vertical movement parallel to block 268 is a clamping mechanism that includes two blocks 280, 282 that have interengaged flanges 284, 286, respectively. Clamping springs 288 urge blocks 280, 282 apart. A coupling structure 290 (FIG. 6) secured to the rear of upper block 280 is connected by means of pin 292 to drive linkage 294 which is mounted for rotation about pin 296. Clamp finger structure 280 extends downwardly from the lower end of block 282.

Figure 5:
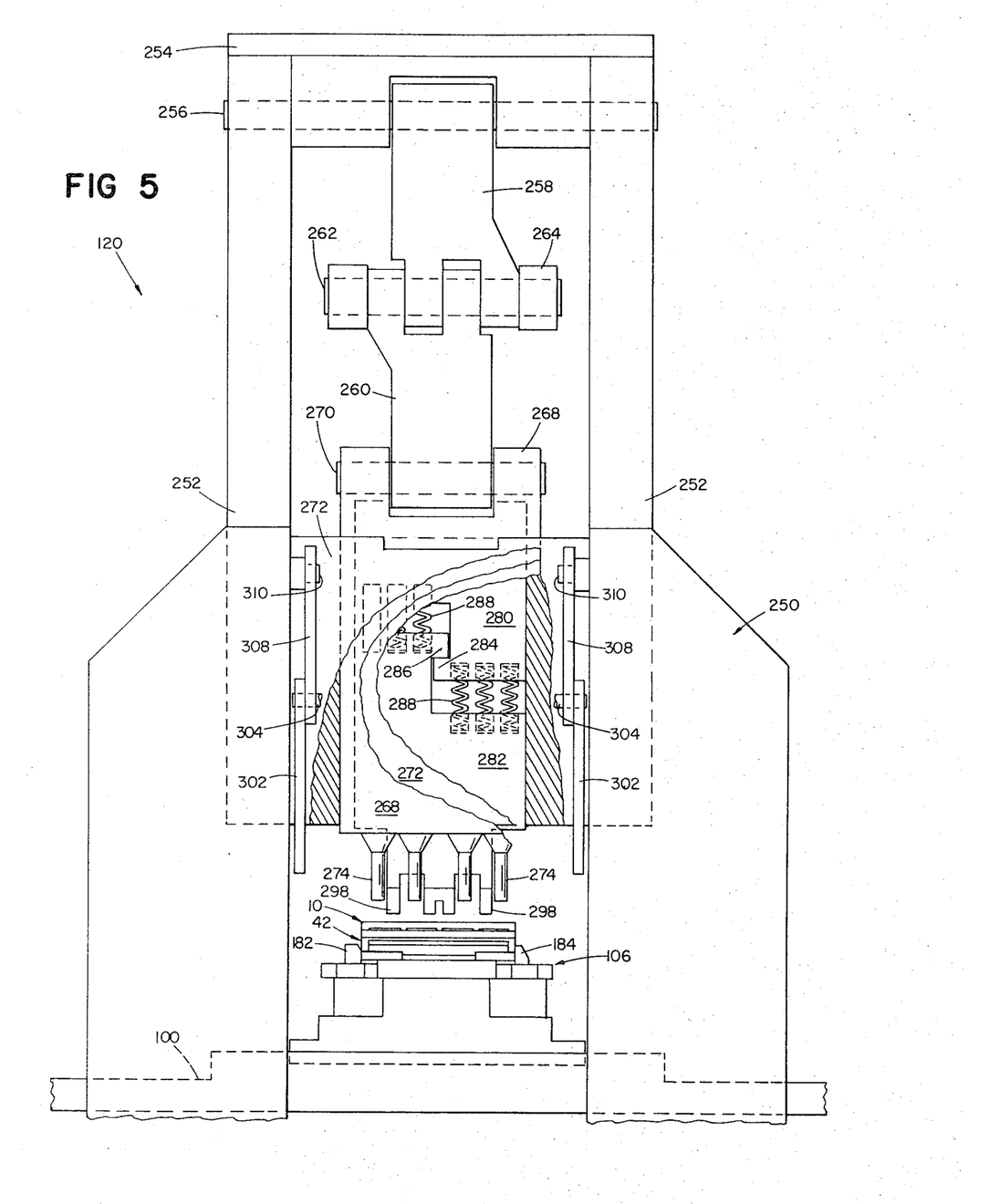
FIG. 5 is a front elevational view, with parts broken away, of the aligning and securing apparatus employed in the system shown in FIG. 3.
Figure 6:
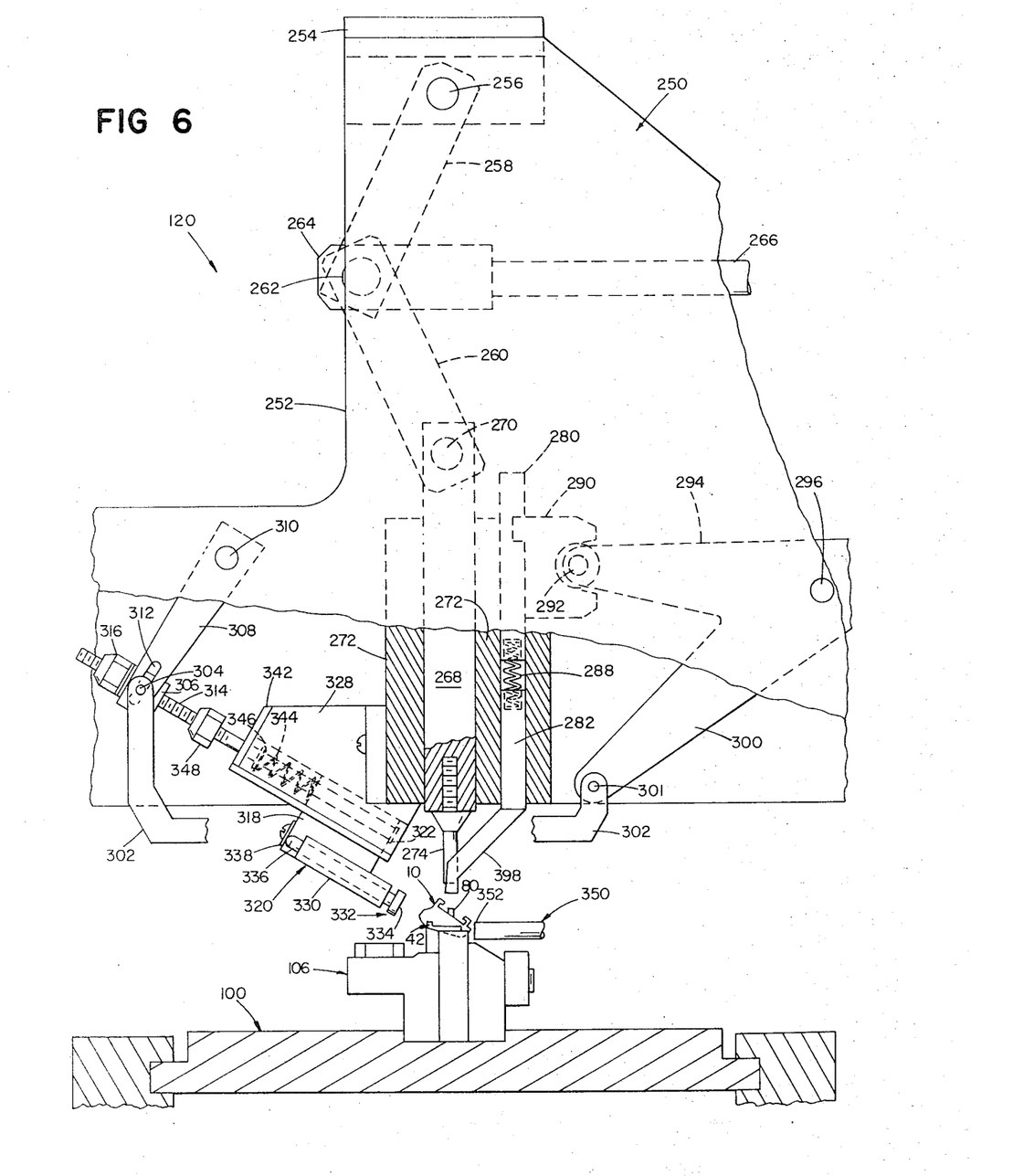
FIG. 6 is an end view, with parts broken away, of the apparatus shown in FIG. 5.
Figure 7:
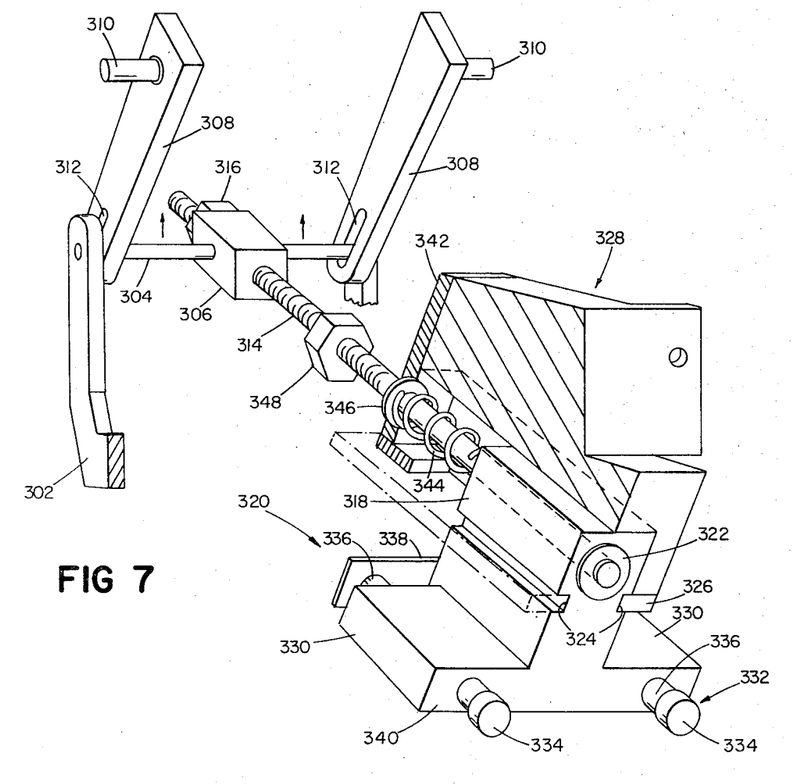
FIG. 7 is a perspective diagrammatic view of the prebiasing and clamping mechanism employed in the apparatus shown in FIGS. 5 and 6.

A second arm 300 of drive link 294 is coupled by pin 301 to link 302, the other end of which is coupled by pin 304 to drive member 306. Auxiliary support links 308, each mounted for pivoting movement on a support shaft 310, have apertures 312 through which shaft 304 extends. Drive rod 314 is threadedly attached to drive member 306 and fixed in position relative thereto by lock 316. Rod 314 passes through a bore in member 318 of clamp structure 320, and is latched to member 318 by retainer disc 322. Member 318 includes two grooves 324 which receive the inside portions of plates 326 that are secured to fixed support structure 328. Thus, parallel support plates 326 define a track along which clamp structure 320 slides. Member 318 further includes two flanges 330 at its base, each of which has a bore through it. Mounted for sliding movement on clamp structure 320 are two bias pads 332, each of which has a forward surface 334 and a rearwardly extending shaft 336. Each shaft 336 passes through a corresponding bore in a flange 330. A lead spring 338 engages the ends of shafts 336 and provides a biasing force tending to space bias pads 332 forward of surface 340 of the support member 318.

Rod 314 also passes through a hole in plate 342 and carries a spring 344 and washer 346. Spring 344 urges the sliding clamp structure 320 to the right as viewed in FIG. 6 against retainer disc 322. Stop nut 348 mounted on shaft rod 314 is arranged to engage support plate 342 to limit the movement of drive rod 314.

Also at station 120 is aligning structure 350 which includes two nozzles 352, each having a one-sixteenth inch I.D. outlet orifice that is spaced apart about 0.050 inch from the components of the blade unit held in the nest 106, the nozzles being aligned with recesses 56 and 92 in the base and cap members, respectively.

Figure 8:
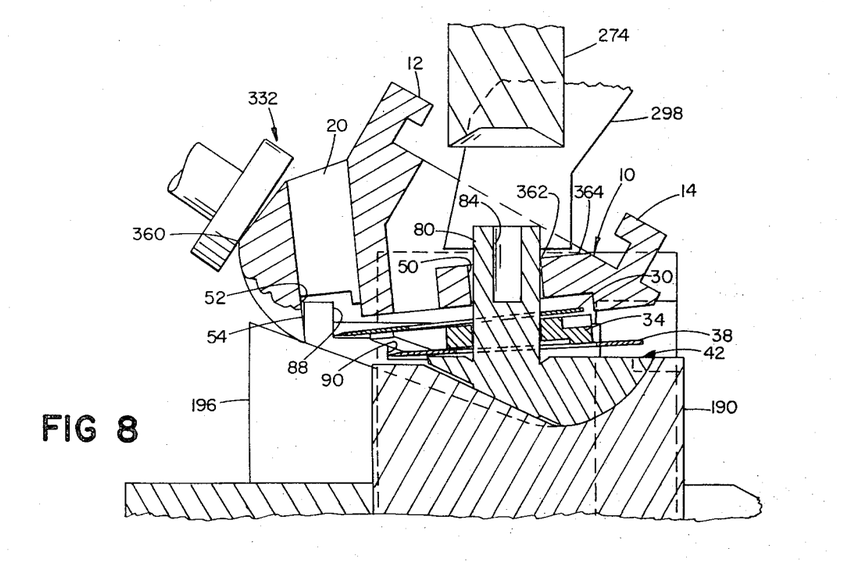
FIG. 8 is a sectional view showing the position of components of the blade unit during an alignment operation in the apparatus shown in FIGS. 5 and 6.
Figure 9:
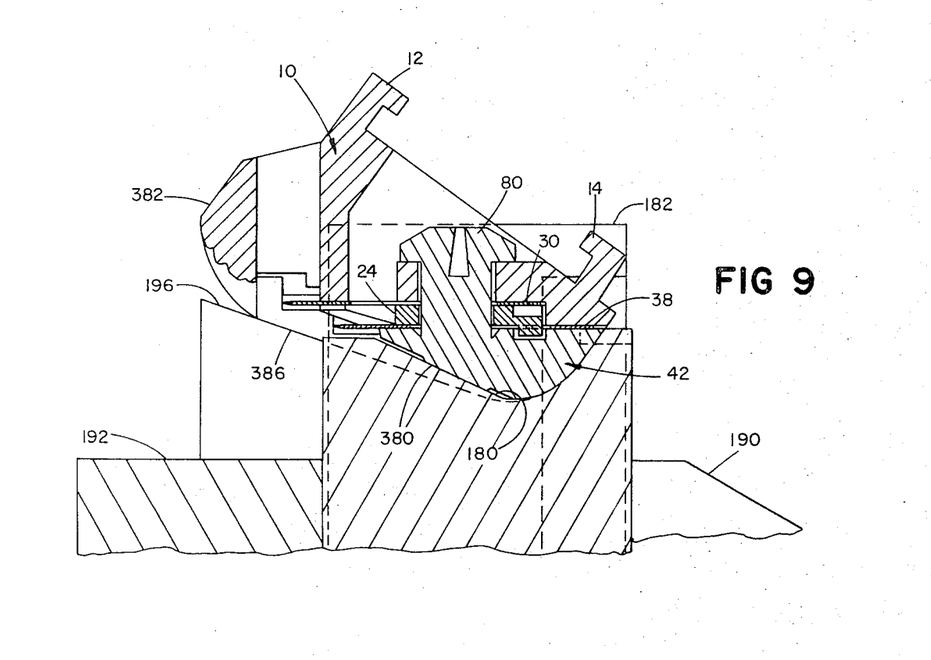
FIG. 9 is a sectional view similar to FIG. 8 showing the configuration of the blade unit after the components have been secured together.

In operation, when a nest 106 is in position at station 120, clamp drive link 294 is rotated to move clamp members 298 down towards the components of the blade unit in the nest and to move bias pad 332 forward to engage surface 360 of guard 18 as shown in FIG. 8. The leaf spring 338 in this position applies a prebiasing load of about 40–50 grams to guard surface 360 tending to tilt the base structure 10 as indicated in FIG. 8. Air pressure is applied through nozzles 350 (at pressure of 60 psi) tending to further lift the base 10. The bias pads 332 maintain aligning surface 52 of each wing in contact with the mating surface 54 of the cap 42 while the engagement of the edges of apertures 50 with posts 80 at point 362 limits the amount that the base 10 can tilt in this motion. The air blast forces the sharpened edges 32, 40 of the blades 30, 38 against reference surfaces 88, 90, respectively, in an aligning operation. Additional clamp force (about 8 pounds) is then applied to drive rod 314 so that the bias pads 332 seat against surface 340 to further urge the aligning surface 52 into engagement with surface 54. At the same time, the clamping plate 280 is moved downwardly so that clamp members 298 engage surface 364 of the base member 10 with a clamping force of 22 pounds. After these clamping forces have been applied, the cold heading tools 274 are moved downward by operation of the toggle mechanism (links 258, 260) to distort the tops of posts 80 as indicated in FIG. 9 to secure the components of the blade unit together. The blades are secured in proper position against their respective aligning surfaces by clamping pressure provided by the deformed posts 80 and by the ridges 94 in the cap 42 and corresponding ridges in the base member 10.

After this operation, the nest is transferred to station 122 where the clamping lever 204 is rotated to release clamping pressure on the assembled blade unit in the nest 106 and then the blade unit is removed and transferred to conveyor 166.

Figure 10:
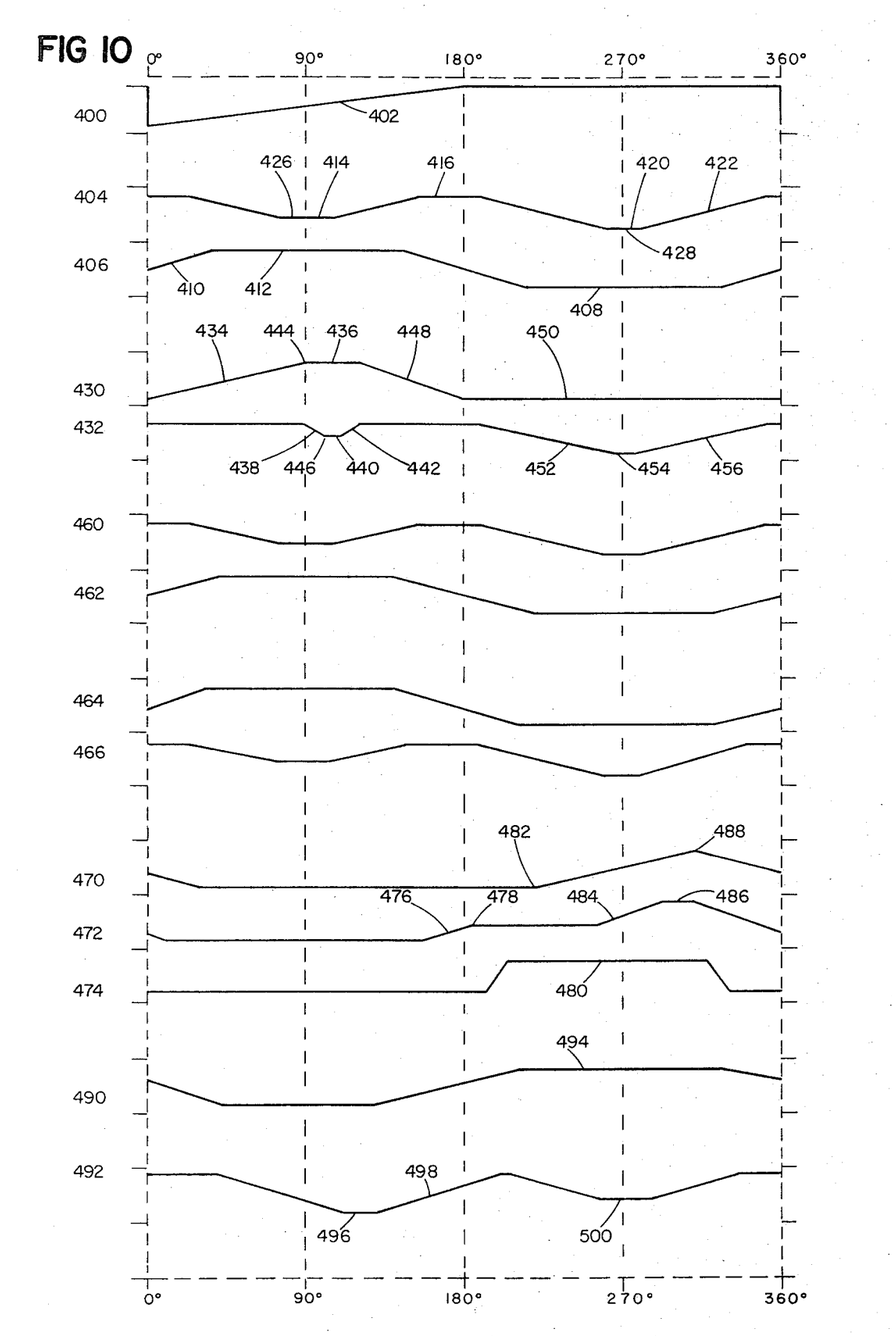
FIG. 10 is a timing diagram indicating a sequence of operations of the assembly system shown in FIG. 3.

The timing diagram shown in FIG. 10 indicates the timing relationships of the several drive cams employed in the coordinated indexing and operation of the several stations in this system. The motion of the cam that controls the indexing of nests 106 is indicated at 400, the nests being indexed from one station to the next as the cam moves from 0° to 180° as indicated by portion 402. The path of the cam that controls the transfer or loading mechanism at the cap loading station 110 is indicated at 404 and the motion of the pickup cam at station 110 is indicated at 406. A cap is picked up by the pickup head when it is in position as indicated at 408 and that head is moved as indicated by line 410 to a transfer position 412. The transfer head is moved into position (414) to accept the cap from the pickup head and then raised to position 416. After the pickup head is returned to the pickup position (line 408), the transfer head is lowered to the position indicated at line 420 to deposit a cap in the nest 106. As the transfer head lowers, it engages the lever 204 to rotate the end post 184 and as it rises (line 422) the end post is rotated by spring 188 to clamp the deposited cap member in the nest. Vacuum is applied at point 426 and released at point 428.

Motions of the slide and transfer mechanisms at the blade loading stations 112 and 116 are indicated at 430 and 432, respectively. Line 434 indicates the lateral motion of the slide 142 from the supply channel 140 to the transfer mechanism 144. While the slide is in the position indicated by line 436, the transfer mechanism is moved down about 0.010 inch towards the slide member 142 as indicated by line 438, picks up the blade during the interval indicated by line 440, and then is retracted as indicated by line 442. Vacuum is turned off slide 142 at point 444 and applied to transfer member 144 at point 446 so that a blade is transferred from the slide to the transfer head. After transfer head has been raised away from slide member 142 (line 442), the slide is retracted, as indicated by line 448, to its initial position in alignment with the supply channel 140 as indicated by line 450. As indicated by line 452, the transfer structure is lowered 2 1/16 inches and the blade is deposited on the posts 80 of the cap member with vacuum being released at point 454. After deposit, transfer structure 144 is returned to its initial position as indicated by line 456.

Deposit of the spacer 34 at station 114 is indicated by lines 460 and 462, the motion being similar to the cap deposit operations indicated at lines 404 and 406; and the base 10 is loaded at station 118 under controls of cams whose travels indicated by line 464, 466, that motion also being similar to the operation at cap loading station 110.

The cams indicated by lines 470, 472 and 474 control operations at the cold heading station 120 (alignment and securing). The cam indicated by line 470 controls the motion of toggle drive member 266; the cam indicated by line 472 controls the clamping motion provided by lever 294; and the cam indicated by line 474 controls application of air pressure to nozzles 352. As the nest is being indexed into position at the station 120, lever 294 starts to rotate as indicated by line 476 to apply a prebias force at point 478. The aligning air blast is applied at 480 to force the blades 30, 38 against their reference surfaces 88, 90 and toggle mechanism drive 266 is started at point 482. Additional clamping force is applied as indicated by line 484 and after the full clamping force is applied (line 486) the full travel of the toggle mechanism is reached at point 488 to cold head the posts 80 as indicated in FIG. 9.

The motion of the blade unit lifting mechanism at unloading station 122 is controlled by the cam indicated by line 490 and the motion of the transfer mechanism is controlled by the cam indicated by line 492. The blade assembly is picked up when the lift cam is in the position 494 and raised to transfer the assembly to the transfer head at point 496. The transfer head then rotates as indicated by the line 498 to transfer the assembly to the output conveyor as indicated at line 500.

Thus it will be noted that operations are concurrently being performed at each of the stations during the interval of cam travel from 180° to 360° at which point the nests 106 on belt 100 are stopped. During each such interval, a cap member is loaded into and clamped in one nest (line 404), blades are being deposited in two other nests (line 432), a spacer member is being deposited in a fourth nest (line 462), a base member is being deposited in still another nest (line 466); the components of the assembly are being aligned and clamped together in still another nest (lines 470, 472 and 474); and the blade unit is removed from still another nest (line 490).

Thus the invention provides methods for assembling components of a multiple blade unit which achieves a desired precise geometry in an efficient and economical manner in a system that can be operated reliably and at mass production speeds.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A method of assembling a razor blade unit having a plural component housing and a blade component, said housing components having cooperating housing alignment and blade alignment surfaces, comprising the steps of securing a first housing component in a predetermined location, depositing said blade component on said first housing component, disposing a second housing component on said blade component, applying a prebiasing force to place said housing alignment surfaces in engagement with one another, then urging said blade component against said blade alignment surfaces while maintaining said prebiasing force on said housing components, and then securing said housing components permanently together to maintain said blade component in the desired aligned relation.

2. The method as claimed in claim 1 wherein said portion of said one housing member comprises a plurality of posts and said blade member and said other housing member have openings through which said posts extend when said blade unit is in said loosely assembled configuration, and said housing members are secured together in permanent relation by distorting the ends of said posts.

3. The method as claimed in claim 1 wherein the cutting edge of the blade component is urged forward against said blade alignment surface.

4. In a method of permanently assembling a blade unit comprising a first housing member, a second housing member, and at least one blade member having a sharpened forward edge, said members being generally planar and in a layered, loosely assembled configuration, said blade unit including a blade member locating surface, a portion of one of said housing members extending beyond the other housing member, the steps of securing said first housing member;
compressing the layered members of said blade unit;

pressing said blade member forwardly against said blade member locating surface; and then
altering the shape of said portion of said one housing member which extends beyond the other housing member so as to lock the two housing members together in permanent relation.

5. The method as claimed in claim 4 wherein said portion of said one housing member comprises a plurality of posts and said blade member and said other housing member have openings through which said posts extend when said blade unit is in said loosely assembled configuration, and said housing members are secured together in permanent relation by distorting the ends of said posts.

6. A method of assembling a razor blade unit comprising the steps of providing a first housing member having a first blade engaging surface and a plurality of posts that extend outwardly of said blade engaging surface, disposing a blade subassembly of two planar blade elements and an interposed spacer on said posts, disposing a second housing member having a second blade engaging surface on said posts, initially aligning said first and second housing members, subjecting said blade subassembly on said posts to further alignment, clamping said housing members and interposed blade subassembly together, and then permanently securing said housing members together to frictionally hold said blade elements in position as determined by said further alignment step.

7. The method as claimed in claim 6 wherein said housing members are secured together by distorting the ends of said posts.

8. The method as claimed in claim 7 wherein one of said housing members includes blade aligning surface means and said further alignment step includes the step of urging the cutting edges of the blade element forward against said aligning surface means.

9. The method as claimed in claim 8 wherein said first housing member is a cap member and includes a housing alignment surface and two sets of offset blade alignment surfaces, said second housing member is a base member that includes a guard structure, and a housing alignment surface that cooperates with the housing alignment surface of said cap member, said cap and base members are initially aligned by applying a prebiasing force to said base member to place the housing alignment surfaces in engagement, said blade elements are then urged against said blade alignment surfaces of said cap member while said prebiasing force is maintained on said base member to align said blade elements relative to said guard surface of said base member, and additional clamping force is then applied to said base member while said posts are being cold headed to provide a permanently assembled blade unit.

* * * * *